United States Patent
Fehn et al.

(10) Patent No.: US 7,324,266 B2
(45) Date of Patent: Jan. 29, 2008

(54) ELECTROOPTICAL ELEMENT

(75) Inventors: Thomas Fehn, Kronach (DE); Stefan Balle, Germering (DE); Sven Poggel, Maisach (DE)

(73) Assignee: LINOS Photonics GmbH & Co. KG, Goettingen (DE)

( * ) Notice: Subject to any disclaimer, the term of this patent is extended or adjusted under 35 U.S.C. 154(b) by 164 days.

(21) Appl. No.: 10/542,556

(22) PCT Filed: Sep. 30, 2004

(86) PCT No.: PCT/EP2004/010949

§ 371 (c)(1),
(2), (4) Date: Jan. 25, 2006

(87) PCT Pub. No.: WO2005/059634

PCT Pub. Date: Jun. 30, 2005

(65) Prior Publication Data

US 2006/0132900 A1    Jun. 22, 2006

(30) Foreign Application Priority Data

Nov. 25, 2003 (DE) .......................... 203 18 348 U

(51) Int. Cl.
*G02F 1/00* (2006.01)
(52) U.S. Cl. ...................... 359/322; 359/247
(58) Field of Classification Search ............... 359/322, 359/245, 247, 248, 252, 254, 257; 385/8, 385/3; 372/12
See application file for complete search history.

(56) References Cited

U.S. PATENT DOCUMENTS

| 3,653,743 A | * | 4/1972 | Kiefer et al. | ............... 359/254 |
| 4,229,079 A | | 10/1980 | Wayne et al. | |
| 5,221,988 A | | 6/1993 | Juhasz et al. | |
| 6,771,410 B1 | * | 8/2004 | Bourlanoff et al. | ......... 359/248 |

FOREIGN PATENT DOCUMENTS

DE     254 867     3/1988
JP     59-61817    4/1984

* cited by examiner

Primary Examiner—Ricky Mack
Assistant Examiner—Tuyen Tra
(74) Attorney, Agent, or Firm—Jordan and Hamburg LLP

(57) ABSTRACT

An electrooptical element is disclosed, made from a crystal, for an electrooptical modulator (EOM), for example, a Pockels cell, comprising a housing, with the crystal arranged therein in the form of a vertical cylinder, the both end surfaces of which form a front plane, for entry of a light beam and an outlet plane, at a separation from the above, with an annular electrode in contact with each of the above and with a retainer, between the housing and both the outer region of the crystal and the two annular electrodes. The invention is characterized in that the retainer is embodied as an O-ring, concentrically enclosing each annular electrode and forming a closed annular chamber between itself and the housing, made from an electrically-conducting material and a hardened sealing compound, filling the annular chamber.

6 Claims, 1 Drawing Sheet

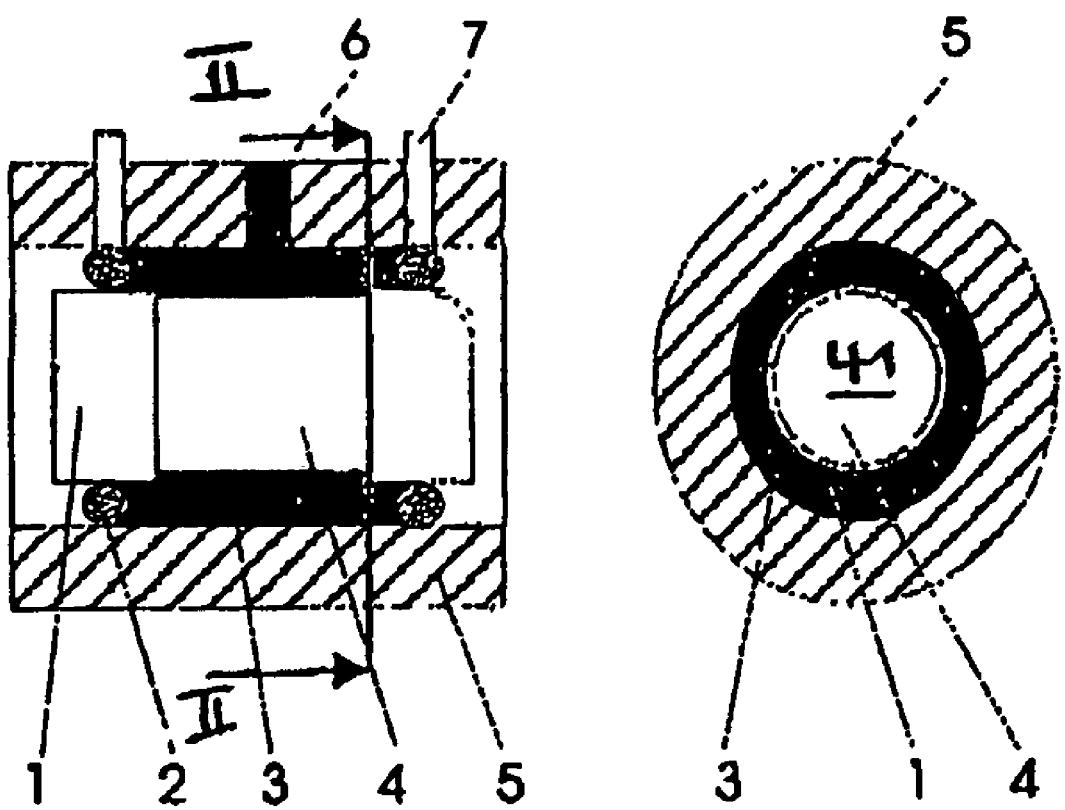

ELECTROOPTICAL ELEMENT

BACKGROUND OF THE INVENTION

The invention relates to a generic electrooptical element for the purpose of installation in an electrooptical modulator (EOM), e.g. Pockels cell, with a housing, with the crystal arranged therein as a vertical cylinder, e.g., circular cylinder or cuboid, whose two cover surfaces form a front plane for a light beam to enter and an exit plane arranged at a distance therefrom and against each of which an annular electrode is placed, and with a holder provided between the housing on one side and both the lateral surface of the crystal and the two annular electrodes on the other side.

Such elements are known. Since all crystals in electrooptical elements have piezoelectric effects, during periodic changes to the applied electrical field the elements demonstrate mechanical elongations, that is, natural oscillations at natural frequencies—so-called piezo resonances—, which cause an additional change in the optical density and during the transmission of the electrical control signal overlay the phase of the light beam, which is very undesirable.

SUMMARY OF THE INVENTION

The object of the invention is to reduce these natural oscillations.

This object is inventively attained, in a generic electrooptical element by its features in that the holder comprises an O-ring made of an electrically conducting material that extends concentrically about each annular electrode and that forms a closed annular space between it and the housing and comprises a hardened filling compound that fills the annular space.

Due to the filling compound, the natural oscillations and the resonant sharpnesses, if any, are advantageously reduced in a surprisingly simple manner, which might be due to the filling compound acting as a sound absorber.

When in one useful design the filling compound and the shape of the annular space are selected such that the characteristic acoustic impedance is matched to the electrooptical element, the result is a maximum reduction in the natural oscillations, which is an additional advantage.

One exemplary embodiment of the invention is described in greater detail in the following using the drawings.

BRIEF DESCRIPTION OF THE DRAWINGS

FIG. 1 is a schematic section of an electrooptical element; and

FIG. 2 is a sectional view taken along the line II-II with FIG. 1.

DESCRIPTION OF THE PREFERRED EMBODIMENTS

The electrooptical element in accordance with FIG. 1 has a housing 5 with a crystal 4 arranged therein in the form of a vertical circular cylinder and is intended for use in a transverse EOM, e.g. a Pockels cell. Its two cover surfaces act as a front plane for the entry of an entering light beam and as a parallel exit plane 41 for the light beam arranged at a distance therefrom. An annular electrode 1 is placed against the cover surfaces.

A holder for these parts (1, 4) is provided between the housing 5 on the one side and both the lateral surface of the crystal 4 and the two annular electrodes 1 on the other side, which are provided with a connection 7.

This holder has an O-ring 2 made of an electrically conducting material that extends concentrically about each annular electrode 1 and that forms a closed annular space between it and the housing. Furthermore, the case of the housing 5 is provided with a fill aperture 6 via which a filling compound made of plastic can be filled in the annular space so that it completely fills the annular space and then hardens. In this manner the crystal 4 and parts of the two annular electrodes 1, if these are not already held by the O-ring, are fixed in the housing 5.

The natural oscillations of the crystals can be effectively dampened by selecting the shape of the annular space and the plastic. Resins, epoxies, lacquers, waxes, thermoplastics, elastomers, duromers, and/or acrylates can be considered for the plastics.

The invention claimed is:

1. Electrooptical element made of a crystal for an electrooptical modulator (EOM), comprising a housing, a crystal arranged therein in the form of a vertical cylinder having two cover surfaces which form a front plane for a light beam to enter and an exit plane arranged at a distance therefrom and against each of which an annular electrode is placed, a holder provided between said housing on one side and both a lateral surface of said crystal and said two annular electrodes on the other side, said holder comprising an O-ring made of an electrically conducting material that extends concentrically about each annular electrode and that forms a closed annular space between it and said housing and comprises a hardened filling compound that fills said annular space.

2. Element in accordance with claim 1, wherein said housing has a case having a fill aperture for said filling compound.

3. Element in accordance with claim 2 wherein said filling compound comprises a plastic.

4. Element in accordance with claim 1, wherein said filling compound comprises a plastic.

5. Element in accordance with claim 4, wherein said plastic for said filling compound comprises resins, epoxies, lacquers, waxes, thermoplastics, elastomers, duromers, and/or acrylates.

6. Element in accordance with claim 1 wherein said electrooptical modulator (EOM) comprises Pockels cell.

* * * * *